United States Patent
Blon et al.

(10) Patent No.: US 7,151,828 B2
(45) Date of Patent: Dec. 19, 2006

(54) CIRCUIT ARRANGEMENT FOR THE ANALOGUE SUPPRESSION OF ECHOES

(75) Inventors: Thomas Blon, Jengen (DE); Thomas Eichler, Unterhaching (DE); Martin Gröpl, München (DE); Peter Laaser, München (DE)

(73) Assignee: Infineon Technologies AG, Munich (DE)

( * ) Notice: Subject to any disclaimer, the term of this patent is extended or adjusted under 35 U.S.C. 154(b) by 582 days.

(21) Appl. No.: 10/311,132

(22) PCT Filed: Feb. 16, 2001

(86) PCT No.: PCT/EP01/01742

§ 371 (c)(1),
(2), (4) Date: May 15, 2003

(87) PCT Pub. No.: WO01/99302

PCT Pub. Date: Dec. 27, 2001

(65) Prior Publication Data

US 2003/0174660 A1 Sep. 18, 2003

(30) Foreign Application Priority Data

Jun. 20, 2000 (DE) .............................. 100 30 123

(51) Int. Cl.
*H04M 9/08* (2006.01)

(52) U.S. Cl. ............................ 379/406.01; 379/406.15; 379/406.16; 370/286; 455/570

(58) Field of Classification Search ................ 379/406.01–406.16; 370/286; 455/570
See application file for complete search history.

(56) References Cited

U.S. PATENT DOCUMENTS

| | | | |
|---|---|---|---|
| 4,591,669 A | * | 5/1986 | Duttweiler et al. .......... 370/291 |
| 4,591,670 A | | 5/1986 | Itoh ........................ 179/170.2 |
| 4,881,262 A | | 11/1989 | Meschkat et al. |
| 5,515,433 A | | 5/1996 | Chen |

FOREIGN PATENT DOCUMENTS

| EP | WO 0013335 | * | 3/2000 |
|---|---|---|---|
| WO | WO 00/133335 | | 3/2000 |

OTHER PUBLICATIONS

W. Gayler, "Telephone Voice Transmission, Standards and Measurements", Winston Gayler, Prentice Hall (1989).
C. Conroy et al., "A CMOS Analog Front-End IC for DMT ADSL", 1999 IEE International Solid-State Circuits Conference, ISSCC 99, Session 14, Paper TP 14.2.

(Continued)

*Primary Examiner*—Wing Chan
*Assistant Examiner*—Ramnandan Singh
(74) *Attorney, Agent, or Firm*—Peter F. Corless; Steven M. Jensen; Edwards Angell Palmer & Dodge LLP

(57) ABSTRACT

A circuit arrangement for the analogue suppression of echoes, as in particular can be used in a hybrid-circuit for DSL-transmission systems, comprises a replica (8) for emulating the behaviour of the transmission line (17). In addition, a circuit (3, 4) for emulating the behaviour of the transmitter (13) is provided, which comprises at least one lowpass (3, 4). Furthermore, a replica (9, 10) for emulating the behaviour of bridge taps (14) can also be provided, which comprises at least one bandpass (9, 10). Additionally, a replica (19) for emulating the behaviour of the line driver (1) can also be provided.

35 Claims, 3 Drawing Sheets

OTHER PUBLICATIONS

R. Hester et al., "CODEC for Echo-Cancelling, Full-Rate ADSL Modems", IEEE International Solid-State Circuits Conference, ISSCC 99, Session 14, Paper TP 14.4 (1999).

F. Pecourt et al., "An Integrated Adaptive Analog Balancing Hybrid for Use in (A)DSL Modems", IEE International Solid-State Circuits Conference ISSCC 99, Session 14, Paper TP 14.8 (1999).

R. Batruni et al., "Mixed Digital/Analog Signal Processing for Single-Chip 2B1Q U-Interface Transceiver", IEEE Journal of Solid-State Circuits, vol. 25, No. 6, Dec. 1990.

Patent Abstracts of Japan, Publication No. 2001-007739 (2001).

* cited by examiner ized and of the transformer provided for
CIRCUIT ARRANGEMENT FOR THE ANALOGUE SUPPRESSION OF ECHOES

BACKGROUND OF THE INVENTION

The present invention relates to a circuit arrangement, which is provided for the analogue suppression of echoes as regards the received signal of a communication device connected via a transformer to a transmission line.

In the case of ISDN and DSL transmission systems, data is transmitted between the exchange and the subscriber via a twisted line wire pair, whereby each of the two line wires is provided simultaneously for both transmission directions, that is to say, for the transmission direction from the exchange to the subscriber and for the transmission direction from the subscriber to the exchange. The signal lying on the line wires is, therefore, composed of a received signal portion and a transmitted signal portion. In order to obtain the received signal—also described as "far end signal"—on the subscriber end, the transmitted or echo signal—also described as "near end echo"—must be subtracted from the overall signal. On the one hand, this can be achieved by adaptive echo canceling, which is implemented digitally. On the other hand, this can be achieved by a so-called hybrid-circuit, which simultaneously executes two-wire/four-wire conversion, in order to separate the transmitted and received signal. Hybrid-circuits are, for example, used in telecommunication transmitting apparatus. Possible configurations of known hybrid-circuits are, for example, described in "Telephone Voice Transmission", Winston D. Gayler, Prentice Hall, 1989.

Echo suppression by a hybrid-circuit has two important advantages. On the one hand, the ratio between the received signal ("far end signal") and the transmitted or echo signal ("near end echo") is boosted by the degree of echo suppression, typically by approx. 20 dB. As a result, less strict requirements on the signal to noise ratio of the analogue/digital converter provided for further processing of the received signal are necessary. On the other hand, in conventional ISDN- or xDSL-transmission systems, a digital linear echo compensator is coupled after the analogue part of the received signal path. This digital linear echo compensator is not able to compensate non-linear distortions of the transmitted signal path, which are found in the echo. Therefore, the ratio between the non-linear distortions and the actual signal portion in the received signal path must be kept very low. The echo suppression of a hybrid-circuit can support this, since the portion of the transmitted signal in the received signal and, therefore, the non-linear distortions, are reduced.

The main technical problem, which arises in the case of hybrid-circuits, is the precise emulation of the transmitted signal related to that point in the transmission system, at which the emulated transmitted signal should be subtracted from the overall signal. The transmitted voltage occurring at a particular point of the transmission system is, essentially, a function of the impedance valid at this point of the transmission line as well as of the transformer provided for transmission. This impedance is greatly variable, since lines of different material and length are used in the application with or without so-called "bridge taps". The term "bridge tap" describes stub cables connected to the line wires of the transmission line, which are provided for the connection of further subscribers, but which are not terminated with a suitable intrinsic impedance and can cause reflections as a result. The problem, therefore, arises of emulating as accurately as possible the impedance of the transmission line and transformer in all cases of application. In the case of an SDSL transmission system ("symmetric digital subscriber line"), such impedance simulation must be optimised in the frequency band of 0 to 400 kHz.

A further system-dependent requirement on the hybrid-circuit in an SDSL transmission system is a signal to noise ratio of at least 90 dB. Further, the power loss of the hybrid-circuit should be as low as possible.

Various circuit arrangements for the suppression of analogue echoes are known from the state of the art.

Thus, for example, in "A CMOS analogue front-end IC for DMT ADSL", C. Conroy et al., 1999 IEEE International Solid-State Circuits Conference, ISSCC 99, Session 14, Paper TP 14.2, it is proposed to implement two identical transmitted signal paths, whereby the first transmitted signal path is used for the primary transmitted signal and the second transmitted signal path to emulate the echo voltage, in order to be able to supply these subsequently on systems with analogue echo suppression.

In "An Integrated Adaptive Analogue Balancing Hybrid for Use in ADSL Modems", F. Pécourt et al., 1999 IEEE International Solid-State Circuits Conference, ISSCC 99, Session 14, Paper TP 14, it is proposed to emulate the transmitted signal appearing in each case at the interesting point of the transmission line as a result of the fact that the transmitted signal produced by the line driver of the particular communication device is filtered by means of an integrated active filter. The filter produces an emulation of the echo occurring in the received signal path, so that echo suppression as regards the received signal can be achieved through subsequent subtraction of the output signal of the filter from the received signal of the corresponding hybrid-circuit.

Finally, a generic circuit arrangement for the suppression of analogue echoes is known from "A 25 kft 768 Kb/s CMOS Transceiver for Multiple Bit-Rate DSL", M. Moyal et al., 1999 IEEE International Solid-State Circuits Conference, ISSCC 99, Session 14, Paper TP 14.4. In this document, a hybrid-circuit is proposed, in which the transmission line is emulated by a scaled impedance model, a so-called replica. Parts of this replica are constructed outside the chip. Additionally, in this document, it is proposed to emulate the main and scatter inductance of the transformer inside the chip by scaled inductive resistors, whereby these inductive resistors are implemented by so-called gyrators. In general, gyrators are understood to mean active circuits with, for example, operation amplifiers and capacitors, which simulate these without using an inductive resistor. Bridge taps are emulated by a RLC-network ("replica") inside the chip, whereby the inductive resistor is also implemented here by a gyrator circuit.

The previously described solutions for emulating the transmitted signal, related to that point in the transmission system, at which subtraction from the received signal should take place, have various disadvantages. In the case of the first solution described above, considerable technological circuit complexity is necessary, since the overall transmitted signal path must be implemented twice. Any mismatch between the two transmitted signal paths results in inadequate echo suppression. In the case of the second solution previously described, the active filter provided to filter the transmitted signal is active over the overall frequency band. Considerable power consumption is required to keep noise within tolerable limits. In the case of the third solution previously described, on the other hand, the gyrators are active over the overall frequency band. Very high power consumption is also required in this case to keep noise within tolerable limits.

SUMMARY OF THE INVENTION

The present invention is, therefore, based on the objective of proposing a circuit arrangement for the suppression of analogue echoes, in particular for combination with a hybrid-circuit, in which the previously described disadvantages do not arise and satisfactory analogue echo suppression can be achieved at minimum cost.

This object is achieved, according to the invention, by a circuit arrangement.

The circuit arrangement according to the invention comprises first circuit means for emulating the behaviour of the transmission line, whereby these first circuit means, in particular, can be implemented by a passive RC network. Further, the circuit arrangement according to the invention comprises second circuit means for emulating the behaviour of the transformer, whereby these second circuit means comprise one or several lowpasses of any level, to which the transmitted signal transmitted by the communication device, that is to say, the output signal of the corresponding line driver, or a corresponding signal of the first circuit device are supplied directly as input signal. Furthermore, the circuit arrangement according to the invention has third circuit means, which, in particular, can be designed in the form of an adder, in order to correct a signal picked up on the transformer (overall signal), which is composed of a received signal portion and a transmitted signal portion, by a signal of the first circuit means and a signal of the second circuit means and, therefore, to obtain the received signal with suppressed echo.

The behaviour of any bridge taps provided in the transmission line can be emulated by one or several bandpasses connected in parallel, to which either the transmitted signal directly or a corresponding signal of the first circuit means is supplied as input signal. The bandpasses just as the lowpasses are connected on the output side to the adder.

It is especially advantageous for emulating the behaviour of the transformer if two lowpasses connected in parallel are used, whereby the one lowpass is a lowpass of first order and the other lowpass a lowpass of second order. All the voltages or signals supplied to the adder, that is to say, in particular, the output signals of the low and bandpasses, can be weighted with corresponding factors, that is to say, with corresponding real positive or negative figures, whereby, in particular, if two lowpasses connected in parallel are used, emulation of the behaviour of the transformer is advantageous, if, for the weighting factors $c_1$ and $c_2$ of the two lowpasses, the following equation applies: $c_2=1-c_1$.

In order to match the circuit arrangement according to the invention adaptively to the particular transmission line used in each case, not only the weighting factors are advantageously variably formulated, but operating parameters of the low and bandpasses, as, for example, the limit frequencies of the low and bandpasses and the quality of the bandpasses, can be adaptively matched directly to the transmission line.

When building up the communication over the transmission line, the optimum parameters of the low and bandpasses are determined adaptively by the digital part of the chip used in each case. An advantageous implementation of the circuit is to provide the variable low and bandpasses as well as the adder inside an integrated circuit, but to construct the first circuit means, that is to say, the replica, for emulating the behaviour of the transmission line, externally. This has various advantages. On the one hand, the low and bandpasses can be adjusted adaptively by an equally integrated digital part to the transmission line, without requiring pins for the control signals. On the other hand, the low and bandpasses as well as the adder can be satisfactorily implemented by integrated operational amplification circuits. In addition, the resistors of the replica of the transmission line must be as small as possible in order to minimise noise. This makes relatively large capacitors necessary, the integration of which would be uneconomic. A further reason for a relatively low-ohm replica of the transmission line is the fact that the inputs of the low and bandpasses put stress on this replicator. Finally, an externally constructed replica of the transmission line would also enable customers to choose the optimum circuit device in each case for their particular application.

An important advantage of the present invention lies in the fact that the emulation of the echo related to that point in the transmission system, at which subtraction from the overall signal should be executed, is as far as possible carried out with passive elements. These are high linear and low noise. The low and bandpasses in each case are only effective in a narrow frequency band and, therefore, influence linearity and noise to a minimum. Compared to the first known solution described at the beginning according to the state of the art, the circuit arrangement according to the invention is considerably less technologically complex, since the overall transmitted signal path does not have to be implemented a second time. Emulation of the echo signal is derived from the actual transmitted signal so that any mismatch between the two transmitted signal types would be insignificant. Since the low and bandpasses provided according to the invention in each case are only effective in a narrow frequency band, considerably less power consumption can be achieved in comparison to the second and third solutions known from the state of the art described above.

In particular, when using line drivers, which are based on the principle of a power source, so-called "current mode" line drivers, a replica of the line driver is used advantageously according to the invention, whereby the output signal of this replica of the line driver or a signal picked up between the replica of the line driver and the replica of the transmission line is supplied to the at least one lowpass as input signal. In this way, when using a "current mode" line driver, improved echo cancelling can also be achieved by the hybrid-circuit so that the demands on the subsequent analogue/digital convertor are reduced.

The present invention is suitable, in particular, for the suppression of analogue echoes in combination with a hybrid-circuit, such as in communication devices for ISDN and XDSL transmission systems, in particular, SDSL transmission systems or Gigabit Ethernet transmission systems etc.

The invention is explained below on the basis of preferred embodiments with reference to the accompanying drawing.

DETAILED DESCRIPTION OF THE INVENTION

Figure 1:
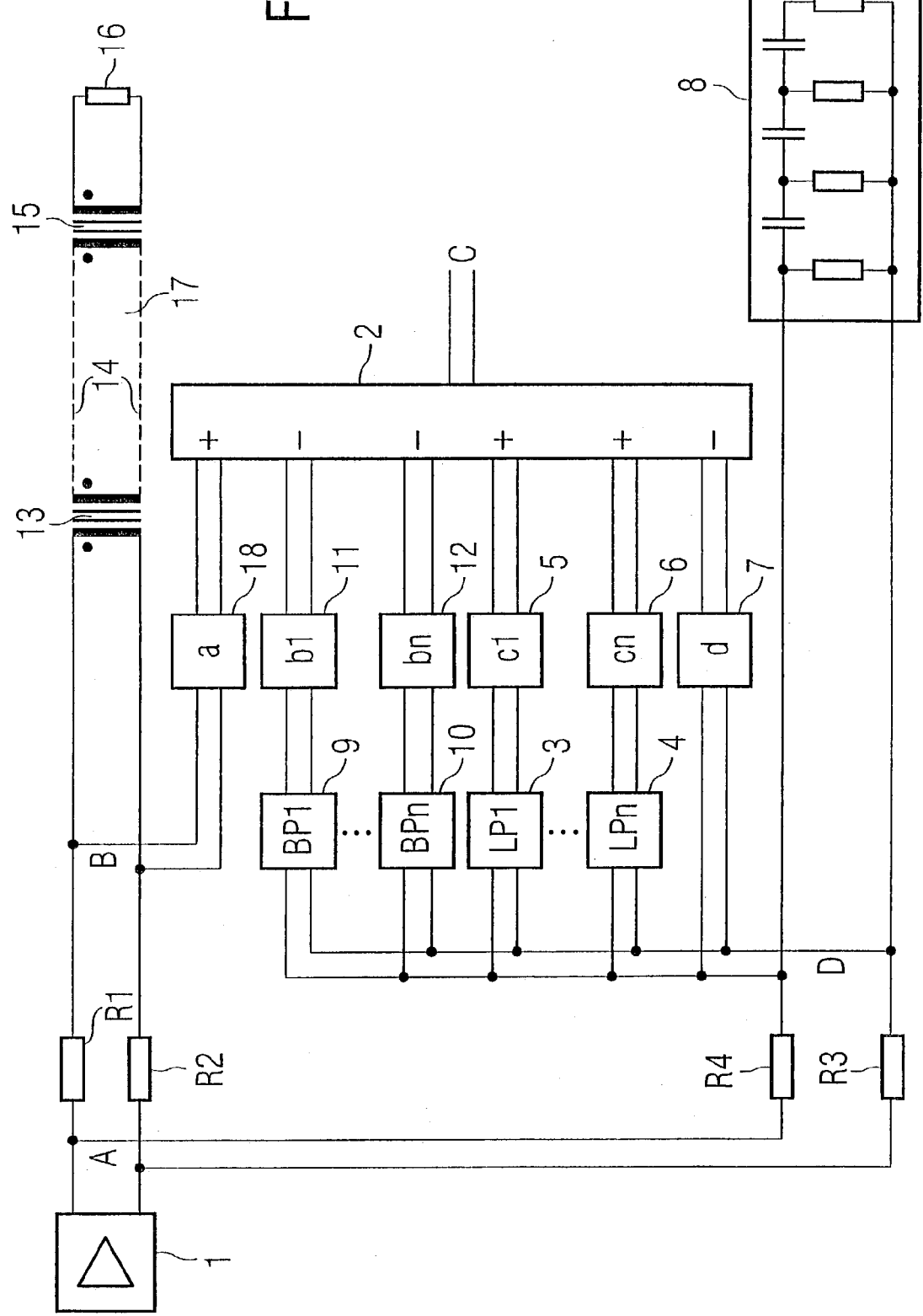
FIG. 1 shows the structure of a circuit arrangement for the suppression of analogue echoes according to a first embodiment of the present invention.

FIG. 1 shows a hybrid circuit of a communication device connected to a transmission line 17, for example, an SDSL transmission line. As normal in itself, the communication device has a line driver 1, which is connected via protective resistors R1 and R2 to a transformer 13. The transformer 13 represents the beginning of the transmission line 17. Stub cables or bridge taps 14 are connected to the transmission line 17. On the receiver end, a transformer 15 is equally provided, which is connected on the input side to the transmission line 17 and is terminated on the output side by a terminal resistor 16.

As clear from FIG. 1, the output voltage of the line driver 1 corresponding to the pure transmitted signal lies on circuit point A shown in FIG. 1, whereas the sum of the received signal obtained over the transmission line 17 and the transmitted signal to be transmitted over the transmission line 17 lies on line point B equally shown in FIG. 1. In order to obtain the pure received signal, therefore, the transmitted signal portion, that is to say, the echo, must be substracted from the voltage lying on circuit point B or the overall signal. For this purpose, a voltage, which corresponds precisely as possible to the echo voltage on point B, is produced in the way described below.

On point A, a circuit ("replica") of the transmitted signal path is connected which emulates the behaviour of the transmitted signal path. This replica comprises resistors R3 and R4 which represent a replica of the resistors R1 and R2, as well as an RC network 8, which represents a replica of the transmission line 17. The dimensions of the RC network are such that the input impedance on point B corresponds to the input impedance of a typical long transmission line without bridge taps. The voltage occurring on point D corresponds in first approximation to the echo voltage lying on point B.

In order to keep the received signal with a greatly reduced echo portion on a circuit point C, the voltage lying on point B is supplied to an adder which subtracts the voltage lying on point D from this, whereby both voltages can be weighted by devices 7 or 18 with factors d or a. With this method of operation, however, the behaviour of the transformer 13 and the bridge taps 14 is not yet taken into consideration.

The transformer 13 with its main and scatter inductance represents a bandpass, the zero point of which is determined by the main inductance and the pole point of which is determined by the scatter inductance. Emulation of the main inductance is, therefore, possible by a highpass, whereby the behaviour of a highpass corresponds to that of an inverted lowpass. In order to take into consideration, in the case of the circuit arrangement shown in FIG. 1, the behaviour of the transformer 13, a lowpass 3 (LP1) is provided, to which the voltage lying on point D is supplied as input voltage, whereby the output signal of the lowpass 3 is supplied to the adder 2. The adder 2 subtracts from the voltage on point D the output voltage of the lowpass 3, so that only the differential voltage resulting from this is subtracted form the voltage lying on point B. The circuit can be improved further by the fact that at least one other lowpass 4 (LPn) is connected in parallel to the lowpass 3, the output voltage of which is likewise substracted by the adder 2 from the voltage at point D. The outputs of the lowpasses 3–4 are preferably weighted by means of devices 5–6 weighted with factors $c_1$–$c_n$. Equally, limit or edge frequencies of the lowpasses 3, 4 can preferably be adjusted so that the circuit can be matched to various types of transformer.

Bridge taps 14 connected to the transmission line 17 in the impedence progression over the frequency on point B cause local minima and maxima, which depend on how far the open line end is away from the input in relation to the wave length ($[2 \cdot n+1] \cdot \lambda/4$=minima, $[n+1] \cdot \lambda 2$=maxima, $n=0 \ldots \infty$). The bridge taps 14 can, therefore, be emulated by additive overlaying of the frequency responses from bandpass filters with the signal on point D. In the case of the circuit arrangement shown in FIG. 1, therefore, bandpasses 9, 10, to which the voltage lying on point D is supplied as input voltage, are provided. The output voltages of the bandpasses 9, 10 are again supplied to the adder 2, which subtracts these output voltages from the voltage picked up on point B. The circuit arrangement can be improved further, if the output voltages of the bandpasses 9–10 are weighted by corresponding devices 11–12 with factors $b_1$–$b_n$. The bandpasses 9, 10 can preferably be adjusted in their quality, limit or edge frequency and amplification, in order to be able to adapt these to the particular lines.

In the case of the circuit arrangement shown in FIG. 1, the input voltage of the low and bandpasses in each case correspond to the voltage picked up on point D, which emulates the transmitted voltage of the line driver 1, that is to say, the voltage lying on point A. Naturally, the transmitted voltage of the line driver 1, that is to say, the voltage lying on point A, can also be supplied directly to the low and bandpasses as input voltage, whereby the low and bandpasses need not have the same input signal.

Figure 2:
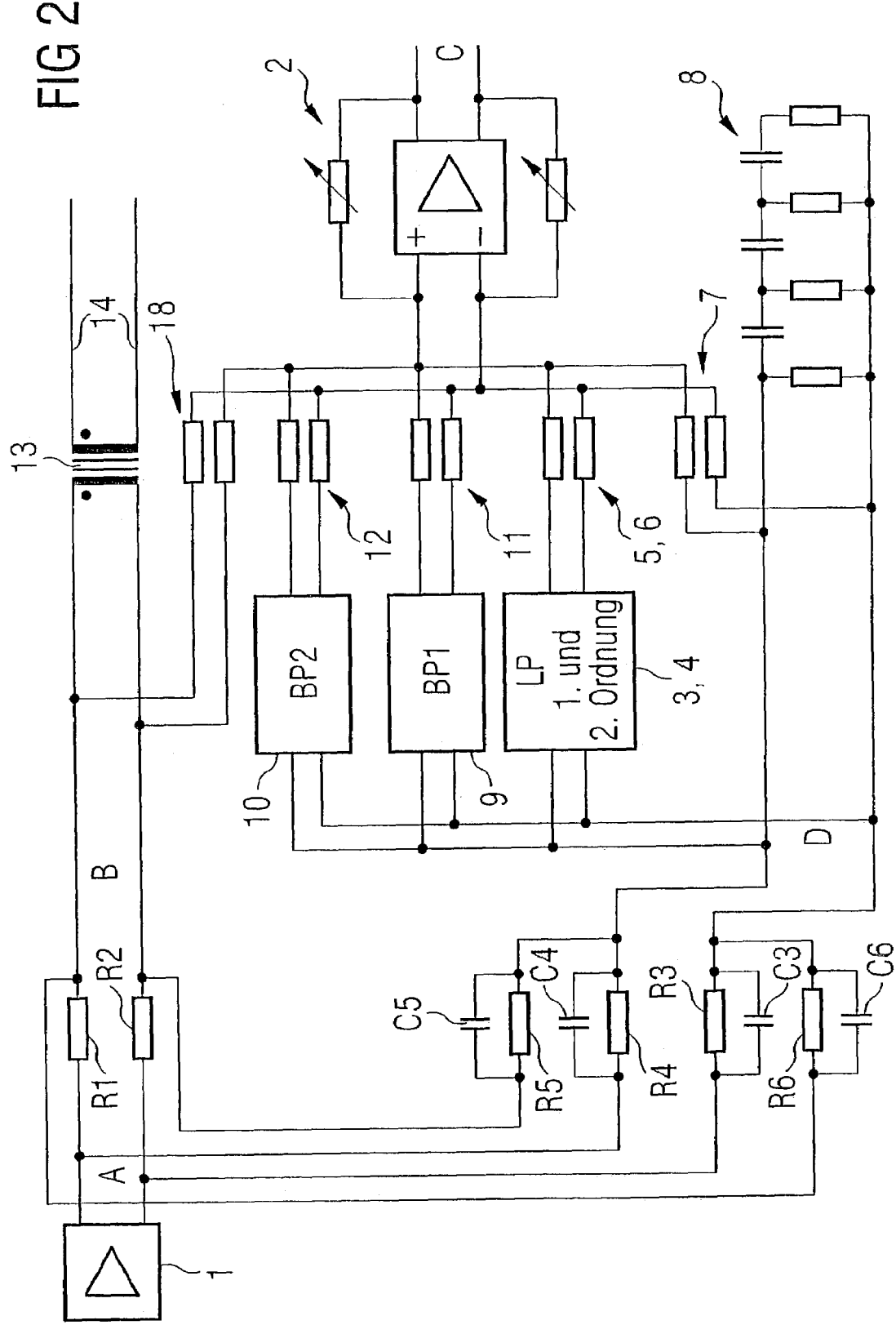
FIG. 2 shows the structure of a circuit arrangement for the suppression of analogue echoes according to a second embodiment of the present invention.

FIG. 2 shows a hybrid circuit according to a second embodiment of the present invention, whereby the parts corresponding to the components shown in FIG. 1 are identified with the same reference numbers.

As clear from FIG. 2, the transmitted signal is not only picked up at point A, but also at point B. The replica 8 of the transmission line is, therefore, connected via resistors R3 and R9 or R5 and R6 both on point A and on point B. This circuit arrangement is especially suitable for using a so-called "synthesized impedance", in order to feed the pure transmitted signal into the replica. Seen from the transformer 13 in the direction of the line driver 1, the input impedance is defined by the serial circuit of the protective resistors R1 and R2 multiplied by the transmission ratio of the transformer 13. A reduction of the resistors R1 and R2 can be actively simulated by the line driver 1, as a result of its output voltage being continually measured in order to impress a corresponding current. This method of operation is described as "synthesized impedance" and results in improved efficiency.

In general, the influence of the scatter inductance of the transformer 13 can be simulated by parallel connection of capacitors to those resistors, which emulate the protective resistors R1 and R2 and/or by corresponding dimensioning of the replica 8 of the transmission line. In the case of the circuit arrangement shown in FIG. 2, for this reason, capacitors C3–C6 are connected in parallel to the resistors R3–R6 in order to emulate the influence of the scatter inductance of the transformer 13.

Preferably, for emulating the main inductance of the transformer 13, the parallel connection of two lowpasses is used, whereby the one lowpass is a lowpass of first order and the other lowpass a lowpass of second order. The output voltages of the two lowpasses are weighted with factors $c_1$ or $c_2$, whereby the ratio: $c_2=1-c_1$ preferably applies.

In the case of the circuit shown in FIG. 2, the weighting devices 5–7, 11, 12 and 18 shown in FIG. 1 are implemented by corresponding resistor circuits. The adder 2 is implemented in the form of an amplifier circuit with variable regenerative resistors.

Simplification of the circuit is achieved by using a transformer 13 with a so-called "sense winding". This concerns an additional winding, which the transformer 13 has on its side facing the line driver 1. In this case, the scatter inductance of the transformer 13 does not have to be taken into consideration, whereby the overall signal is not picked up at point B, but directly on the "sense winding" of the transformer 13.

In the case of wired communication systems of high data rate, for example, the communication system Gigabit Ethernet 1000Base-T, instead of a line driver working as voltage source a so-called "current mode" line driver, that is to say a line driver working as power source, is frequently used. In this case, modification of the embodiments shown in FIG. 1 and FIG. 2 as shown in FIG. 3 is recommended.

Figure 3:
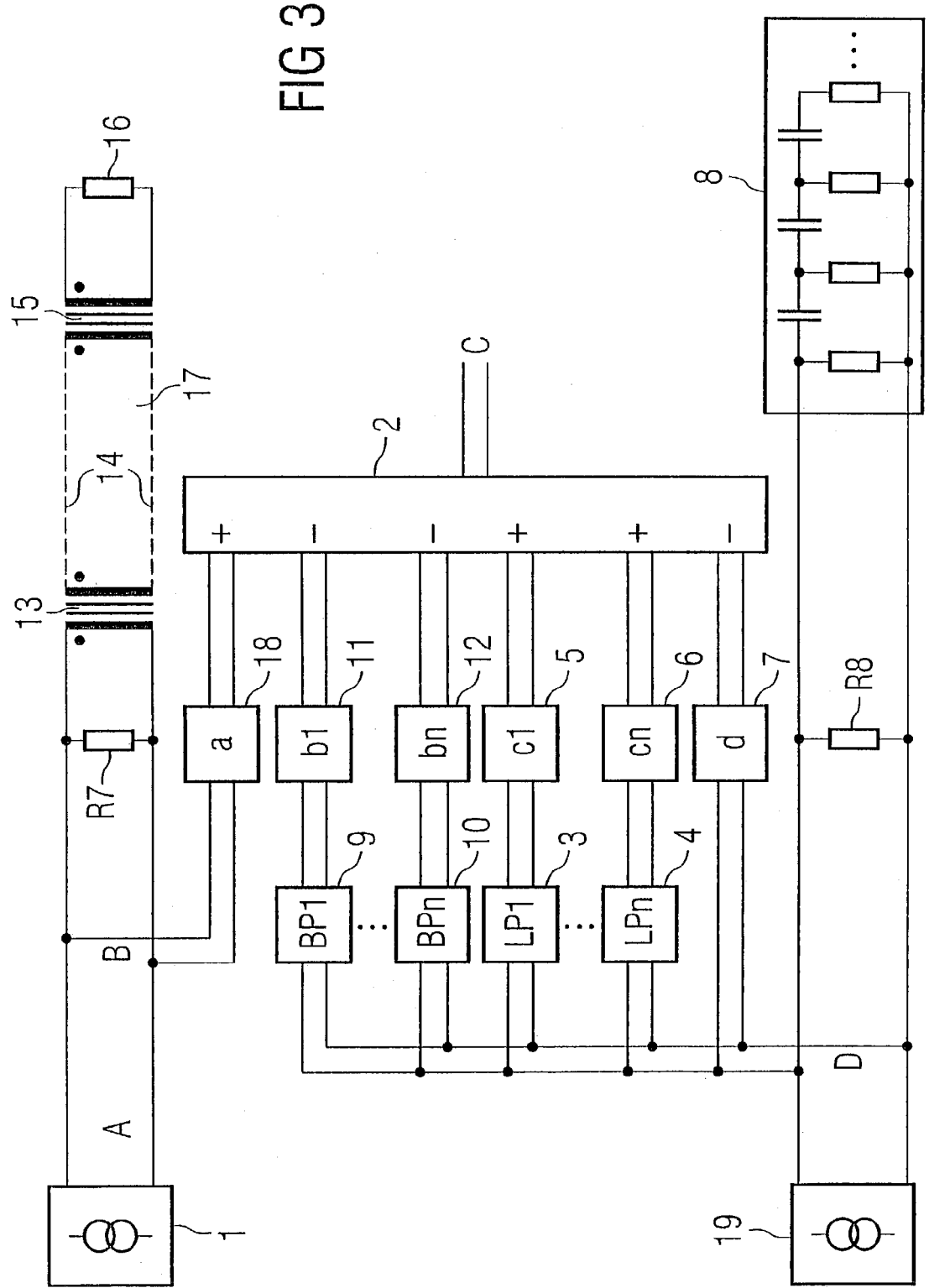
FIG. 3 shows the structure of a circuit arrangement for the suppression of analogue echoes according to a third embodiment of the present invention.

As shown in FIG. 3, a replica 19 of the "current mode" line driver 1 is used. The line driver 1 is connected to the transformer 13, which represents the beginning of the transmission line 17. A resistor R7, which works as line terminal resistor, is connected in parallel with the transformer 13. This line terminal resistor R7 can also possibly be actively emulated by the line driver 1 and then is no longer needed as a component part.

For emulating the line terminal resistor R7 (if present), a resistor R8 is provided, which is connected in parallel to the replica 8 of the transmission line 17 and the replica 19 of the line driver 1. The resistor R8 can also be integrated into the replica 8 of the transmission line 17 and then is no longer present as a separate component part.

The replica 19 of the line driver 1 emulates the behaviour of the line driver 1 as exactly as possible, whereby, if necessary, scaled emulation is also possible and receives the same transmitted data as the line driver 1. In this way, a signal is supplied into the parallel connection by the replica 19 of the line driver 1 from the resistor R8 and the replica 8 of the transmission line 17 which is identical to the transmitted signal of the line driver 1. The voltage on point D corresponds in first approximation to the echo voltage on point A (=point B), whereby the behaviour of the transformer 13 as well as the bridge taps 14 are not yet taken into consideration. As in the case of the embodiments shown in FIG. 1 and FIG. 2, at least one lowpass 3, 4 is provided for considering the behaviour of the transformer 13 and at least one bandpass 9, 10 is provided for considering the bridge taps 14, to which, in each case, the voltage lying on point D is supplied as input signal.

The components of the circuit arrangement shown in FIG. 3, which are already shown in FIG. 1 or FIG. 2, correspond to the components shown in FIG. 1 and FIG. 2, so that, in this regard as well as regards the operating method of the circuit arrangement shown in FIG. 3, reference can be made to the above explanations regarding FIG. 1 and FIG. 2.

The invention claimed is:

1. Circuit arrangement for the analogue suppression of echoes for the received signal of a communication device connected via a transformer to a transmission line,
   with first circuit means for emulating the behaviour of the transmission line,
   with second circuit means for emulating the behaviour of the transformer, and
   with third circuit means for correcting a signal picked up on the transformer, which comprises a received signal portion and a transmitted signal portion of the communication device, by a signal of the first circuit means and a signal of the second circuit means, in order to obtain the received signal portion with suppressed transmitted signal portion,
   characterised in that
   the second circuit means comprise at least one lowpass, which is set up for emulating the behaviour of the transformer and to which a signal is supplied as input signal, which corresponds to the transmitted signal to be transmitted by the communication device over the transmission line.

2. Circuit arrangement according to claim 1, wherein the communication device comprises a line driver and passive component parts connected between the line driver and the transformer, whereby the first circuit means is connected between the line driver and the passive component parts.

3. Circuit arrangement according to claim 2, wherein the signal to be corrected, which comprises the received signal portion and the transmitted signal portion, is picked up between the passive component parts and the transformer and supplied to the third circuit means.

4. Circuit arrangement according to claim 1, wherein the signal to be corrected, which comprises the received signal portion and the transmitted signal portion, is picked up on an additional winding of the transformer and supplied to the third circuit means.

5. Circuit arrangement according to claim 1, wherein the first circuit means comprise a first circuit section, which is set up for emulating the behaviour of the passive component parts and a second circuit section, which is set up for emulating the behaviour of the transmission line.

6. Circuit arrangement according to claim 5, wherein the first circuit section comprises resistors, which are set up for emulating the behaviour of the passive component parts designed as protective resistors.

7. Circuit arrangement according to claim 6, wherein in each case a capacitor is connected in parallel to the resistors of the first circuit section of the first circuit means.

8. Circuit arrangement according to claim 5, wherein the second circuit section comprises a passive network, which is set up for emulating the behaviour of the transmission line.

9. Circuit arrangement according to claim 8, wherein second circuit section comprises a passive RC network, which is set up for emulating the behaviour of the transmission line.

10. Circuit arrangement according to claim 5, wherein the transmitted signal of the line driver or a signal picked up between the first circuit section and the second circuit section of the first circuit means is supplied to the at least one lowpass of the second circuit means as input signal.

11. Circuit arrangement according to claim 5, wherein the signal to be corrected, which comprises the received signal portion and the transmitted signal portion, the output signal of the at least one lowpass of the second circuit device and the signal picked up between the first circuit section and the second circuit section of the second circuit means are supplied to the third circuit means, whereby the third circuit means are designed in such a way that it adds to the signal to be corrected, which comprises the received signal portion and the transmitted signal portion, the output signal of the at least one lowpass of the second circuit means and subtracts from this the signal picked up between the first circuit section and the second circuit section of the first circuit means, in order to obtain the received signal portion with suppressed transmitted signal portion.

12. Circuit arrangement according to claim 5, wherein the first circuit section is connected both between the line driver and the passive component parts and between the passive component parts and the transmitter.

13. Circuit arrangement according to claim 5 or claim 6, wherein for the weighting factors of the weighting devices assigned to the two lowpasses the equation $c2=1-c1$ applies, whereby $c1$ is the weighting factor assigned to the one lowpass and $c2$ the weighting factor assigned to the other lowpass.

14. Circuit arrangement according to claim 1, wherein the signal to be corrected, which comprises the received signal portion and the transmitted signal portion, is supplied to the third circuit means via a weighting device with a variable weighting factor.

15. Circuit arrangement according to claim 1, wherein the signal supplied by the first circuit means to the third circuit means is supplied via a weighting device with a variable weighting factor.

16. Circuit arrangement according to claim 1, wherein the at least one output signal of the at least one lowpass of the second circuit means is supplied via a weighting device with a variable weighting factor to the third circuit means.

17. Circuit arrangement according to claim 1, wherein the second circuit means comprise at least two parallel connected lowpasses, which are set up for emulating the behaviour of the transmitter and the output signals of which are supplied in each case to the third circuit means for adding to the signal to be corrected, which comprises the received signal portion and the transmitted signal portion, and that the one lowpass is a lowpass of first order and the other lowpass a lowpass of second order.

18. Circuit arrangement according to claim 1, wherein at least one parameter of the at least one lowpass of the second circuit means is variable.

19. Circuit arrangement according to claim 1, wherein fourth circuit means, which are set up for emulating the behaviour of stub cables connected to the transmission line, are provided, whereby a signal of the fourth circuit means is supplied to the third circuit means for correcting the signal, which comprises the received signal portion and the transmitted signal portion.

20. Circuit arrangement according to claim 5 or claim 19, wherein the fourth circuit means comprises at least one bandpass filter, to which as input signal the transmitted signal of the line driver or a signal picked up between the first circuit section and the second circuit section of the first circuit means, is supplied.

21. Circuit arrangement according to claim 20, wherein the fourth circuit means comprise several parallel connected bandpass filters.

22. Circuit arrangement according to claim 20, wherein the output signal of the at least one bandpass filter is supplied via a weighting device with a variable weighting factor to the third circuit means.

23. Circuit arrangement according to claim 20, wherein the output signal of the at least one bandpass filter is supplied to the third circuit means for subtracting the signal to be corrected, which comprises the received signal portion and the transmitted signal portion.

24. Circuit arrangement according to claim 20, wherein at least one parameter, of the at least one bandpass filter of the fourth circuit means is variable.

25. Circuit arrangement according to claim 19, wherein the second circuit device, the third circuit device and the fourth circuit device are provided on a common chip, whereas the first circuit device is provided outside the chip.

26. Circuit arrangement according to claim 1, wherein the communication device comprises a line driver for producing the transmitted signal, and that further circuit means, which are set up for emulating the behaviour of the line driver, are provided, whereby a signal produced by the further circuit means and corresponding to the transmitted signal of the line driver is supplied to the at least one lowpass of the second circuit means as input signal.

27. Circuit arrangement according to claim 26, wherein the line driver is a line driver working according to the principle of a power source.

28. Circuit arrangement according to claim 26, wherein the further circuit means, which are set up for emulating the behaviour of the line driver, are coupled with the first circuit means, which are set up for emulating the behaviour of the transmission line, and that a signal picked up between the further circuit means and the first circuit means is supplied to the at least one lowpass of the second circuit means as input signal.

29. Circuit arrangement according to claim 26, wherein the communication device comprises a passive component part connected between the line driver and the transformer, whereby the signal to be corrected, which comprises the received signal portion and the transmitted signal portion, is picked up between the line driver and the passive component part and is supplied to the third circuit means.

30. Circuit arrangement according to claim 29, wherein the first circuit means comprises a first circuit section, which is set up for emulating the behaviour of the passive component part, and a second circuit section coupled with the first circuit section for emulating the behaviour of the transmission line, and that a signal picked up between the further circuit means and the first circuit section of the first circuit means is supplied to the at least one lowpass of the second circuit means.

31. Circuit arrangement according to claim 30, wherein the signal to be corrected which comprises the received signal portion and the transmitted signal portion, the output signal of the at least one lowpass of the second circuit means and a signal picked up between the further circuit means and the first circuit section of the first circuit means is supplied to the third circuit means, whereby the third circuit means are configured in such a way that they add to the signal to be corrected, which comprises the received signal portion and the transmitted signal portion, the output signal of the at least one lowpass of the second circuit means and subtracts from this the signal picked up between the further circuit means and the first circuit section of the first circuit means, in order to obtain the received signal portion with suppressed transmitted signal portion.

32. Circuit arrangement according to claim 30, wherein the second circuit section of the first circuit means comprises a passive network for emulating the behaviour of the transmission line.

33. Circuit arrangement according to claim 32, wherein the second circuit section of the first circuit means comprises a passive RC network, which is set up for emulating the behaviour of the transmission line.

34. Circuit arrangement according to claim 30, wherein the first circuit section of the first circuit means comprises a resistor, which is set up for emulating the behaviour of the passive component part designed as resistor.

35. Circuit arrangement according to claim 30, wherein the first circuit section, which is set up for emulating the behaviour of the passive component part, is integrated in the second circuit section, which is set up for emulating the behaviour of the transmission line.

* * * * *